United States Patent [19]

Long et al.

[11] Patent Number: 4,707,414
[45] Date of Patent: Nov. 17, 1987

[54] ELECTROSTATIC-FREE PACKAGE

[75] Inventors: Stuart G. Long, South Laguna; Michael J. Maciocia, Ontario, both of Calif.

[73] Assignee: General Dynamics, Pomona Division, Pomona, Calif.

[21] Appl. No.: 836,727

[22] Filed: Mar. 6, 1986

Related U.S. Application Data

[62] Division of Ser. No. 597,974, Apr. 9, 1984, abandoned.

[51] Int. Cl.⁴ .................. B32B 23/08; B32B 27/00; B62B 11/52; B65D 23/02
[52] U.S. Cl. .................. 428/511; 428/35; 428/424.8; 428/500; 428/507; 428/512; 428/910; 53/409; 53/427; 206/328; 206/464; 206/497; 206/534.1; 252/510
[58] Field of Search .................. 428/35, 910, 424.8, 428/500, 507, 511, 512; 53/409, 427; 524/911, 913; 252/510, 511; 206/328, 464, 470, 497, 534.1

[56] References Cited

U.S. PATENT DOCUMENTS

| | | | |
|---|---|---|---|
| 3,756,399 | 9/1973 | Cosier et al. | 206/80 A |
| 3,784,004 | 1/1974 | Meyer | 206/80 A |
| 3,791,571 | 2/1974 | Bilz, III | 229/40 |
| 3,872,604 | 3/1975 | Keller | 34/9 |
| 3,898,166 | 8/1975 | Cooney | 252/8.75 |
| 4,066,120 | 1/1978 | Kelly et al. | 428/483 |
| 4,117,193 | 9/1978 | Tsuchiya et al. | 428/339 |
| 4,225,644 | 9/1980 | Tsuchiya et al. | 428/215 |
| 4,252,851 | 2/1981 | Lansbury et al. | 428/336 |
| 4,302,504 | 11/1981 | Lansbury et al. | 428/332 |
| 4,384,024 | 5/1983 | Mitchell et al. | 428/349 |
| 4,460,631 | 7/1984 | Stegmeier et al. | 428/35 |
| 4,472,474 | 9/1984 | Grouheim et al. | 428/195 |
| 4,478,903 | 10/1984 | Kishida et al. | 428/216 |
| 4,554,210 | 11/1985 | Long et al. | 428/349 |
| 4,590,741 | 5/1986 | Long et al. | 53/427 |

FOREIGN PATENT DOCUMENTS 126237 12/1947 Australia .................. 206/42

Primary Examiner—John E. Kittle
Assistant Examiner—Patrick J. Ryan
Attorney, Agent, or Firm—Neil F. Martin; Terrance A. Meador; Edward B. Johnson

[57] ABSTRACT

A rigid packaging material having a coating of heat-sealable, anti-static plastic. A fiberboard sheet substrate is coated with a lamina of polyethylene made electrostatic-free by the addition of an organic anti-static compound. When skin-packaged with a film of heat sealable, anti-static plastic material, a static-sensitive item is completely enclosed by a static-free barrier package.

5 Claims, 4 Drawing Figures

ELECTROSTATIC-FREE PACKAGE

The Government has rights in this invention pursuant to Contract No. N00024-81-C-7087, awarded by the U.S. Navy.

This is a division of application Ser. No. 597,974 filed Apr. 9, 1984, now abandoned.

BACKGROUND OF THE INVENTION

The present invention relates to anti-static packaging material and to methods of producing such materials, and more particularly to a laminated packaging material having a semi-rigid substrate sheet of packaging material which is coated with a layer of heat-sealable, anti-static plastic material. The structure provides both mechanical support for a static-sensitive item to be packaged and a continuous electrostatic shield to protect the item from static buildup while it is being packaged. Furthermore, the heat-sealable plastic coating permits a flexible anti-static skin film to be heat sealed to the material so that it may be employed in skin-packaging systems.

Heat-sealable, anti-static packaging materials which are intended to protect static-sensitive items from damage due to triboelectric charging are known in the art. Such a material is disclosed, for example, in U.S. Pat. No. 3,572,499 to Mondano which discloses the fabrication of a laminate material consisting of a layer of metal foil which is sandwiched between an electrically conductive, heat-sealable, synthetic plastic. The material disclosed in the Mondano patent is intended to be used as a wrap or fabricated into a bag, and is not practical for use in skin-packaging operations, either as a skin-packaging film or as a relatively rigid material which can support the item being packaged. A laminated heat-sealable packaging material which is provided in sheet form and which is resistant to the penetration of grease or oil is taught in U.S. Pat. No. 3,775,239 to Snow. This packaging material, although excellent in resistance to certain specified compounds, does not provide an anti-static protection to static-sensitive components. A method of coating various surfaces with a plastic coating material to which a metallic powder has been added is taught in U.S. Pat. No. 3,085,025 to Eaton. The method of the Eaton patent includes applying a thermoplastic material to the surface to be coated followed by applying a powdered metallic matter to the thermoplastic material, and then heating the film to a viscous liquid into which the powdered matter migrates. The liquid is then cooled so that it is returned to its solid-state with the powder bonded thereto. However, the object of the Eaton process is to utilize the suspended powdered metal to provide a surface appearance to the coated object, not to impart electrical characteristics such as a resistance to static discharge.

U.S. Pat. No. 3,104,985 discloses compositions of cured polyolifin which are suitable for producing conductive films by adding fillers such as carbon black to solutions of plastic. Carbon black is an unacceptable material for use in many packaging operations since it sloughs off of the plastic in which it is dissolved and contaminates the packaged items. U.S. Pat. No. 2,405,104 teaches the construction of an anti-static ordnance bag having a layer of combustible material which is inappropriate for use in skin packaging operations. A method for encapsulating rigid items in molten plastic is described in U.S. Pat. No. 3,313,089; however, no reference or teaching is made of providing anti-static material in my method step to prevent the buildup of static charges.

Other examples of various coating, packaging, or bagging techniques or materials are found in the following U.S. Pat. Nos.: 3,373,918; 3,143,364; 3,078,201; 3,057,539; 2,845,962; 2,817,604; and 2,551,087. However, such techniques and materials are not adapted for use in skin packaging operations of the type already owned and maintained by many packaging enterprises.

Therefore, a need exists for a material which is suitable for packaging static-sensitive items which combines protection of the item from exposure to electrostatic charge, mechanical support of the item while it is being packaged and handled in packaged form, and adaptability to state-of-the-art packaging techniques.

It is therefore a principle object of the present invention to provide an improved material for packaging static-sensitive items.

It is a further object of the invention to provide an anti-static packaging material which can be utilized in a heat-sealable, skin-packaging process.

Another object of the invention is to provide an anti-static, heat-sealable packaging material which provides mechanical support to the item being packaged.

Another object of the invention is to provide an anti-static heat-sealable package which is constructed from such a material.

A further object of the invention is the provision of a method for making such a material.

These and other objects of the invention will become readily apparent from the ensuing description when it is taken together with the following drawings.

SUMMARY OF THE INVENTION

The present invention provides an improvement over existing anti-static packaging materials by utilizing a sheet of stiff substrate material on at least one surface of which a sheet of heat-sealable organic plastic material is formed which has been made electrostatic-free by the addition of an organic anti-static compound. The resulting packaging material can then be formed into a six-sided anti-static container for the packaging of static-sensitive items, or a sheet of the material may provide electrostatic protection and mechanical support to an item which is to be skin-packaged with a heat-sealable plastic sheet.

The present invention also provides a method for producing such a material.

DESCRIPTION OF THE PREFERRED EMBODIMENT

As is known in the packaging art, certain techniques are used to package static-sensitive items for storage or shipment. One packaging technique involves the construction or assembly of a six-sided container, such as a box, in which the item to be packaged is enclosed. Another, more modern method, called "skin-packaging", consists of drawing a vacuum between the item and a semi-molten plastic film. The heated, semi-molten film bonds to itself and around the item during cooling, thereby forming a seal which maintains the vacuum between itself and the enclosed item. Typically, when being skin-packaged, the item will be carried on a piece of stiff material which provides support for the item during the packaging procedure. A packaging material which is useful with either packaging technique and which provides protection from static buildup for static-sensitive items such as electronic components or modules is illustrated in FIG. 1.

Figure 1:
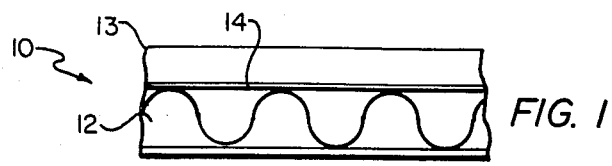
FIG. 1 is an enlarged partial side section showing the structure of the packaging material according to the present invention.

As shown in FIG. 1, the material of the invention, indicated generally by 10, consists of a substrate sheet of packaging material 12. The substrate material preferably comprises a standard packaging material which possesses sufficient stiffness or rigidity to provide support to an item to be packaged, yet which is deformable so that it can be shaped into the form of a package. Such a material can comprise, for example, cardboard or fiberboard, either of which is commonly used to construct six-sided enclosures such as boxes for packaging electronic items.

A second layer 13 is formed on, and is co-extensive with a surface 14 of the substrate sheet 12. The material layer 13 possesses a high surface resistivity to prevent the buildup and discharge of static electricity between an item which is to be packaged and the surface of the packaging material 12 which encloses the item. The material layer 13 is composed of a thermoplastic resin to which an organic anti-static compound has been added to provide the resulting material with the level of electrical resistivity which is necessary to prevent the buildup of static charges. The material layer 13 also possesses the characteristic of being able to bond to a semi-molten plastic film which is used in a skin-packaging process. A thermoplastic ionomer resin material which is commercially available from E. I. du-Pont de Nemours and Company under the trademark "Surlyn D" is useful as the basis material from which the material layer 13 may be formed.

In composing the layer 13, a solution can be made which consists of the materials listed in Table I. The materials are listed in Table I together with the portion which they contribute to the total volume of the solution. For example, the polyethylene compound constitutes between 31% and 34% of the solution volume.

TABLE I

| MATERIAL | PORTION OF SOLUTION VOLUME |
| --- | --- |
| Polyethylene Compound | 31–34% |
| Deionized Water | 30–34% |
| Isopropynol Alcohol | 30–34% |
| Organic Anti-Static Compound | >2% |

The organic anti-static compound can comprise a tertiary fatty amine plus any number of other compounds known and used in the art.

A solution having a composition as specified in Table I is heated to approximately 200° F. in order to make it viscous so that it can be mixed to a homogeneous composition and applied by any known technique to the substrate sheet 12. For example, the heated solution may be applied by any known laminating technique. Once the solution is applied to the surface of the substrate sheet 12, it is metered to any desired thickness and then cooled and dried. Once the material layer 13 has been applied to the surface of the substrate sheet 12, the uniformly distributed organic anti-static compound will provide the packaging material 10 with the resistance to the formation of surface static charges which is required for the packaging of static-sensitive items.

Figure 2:
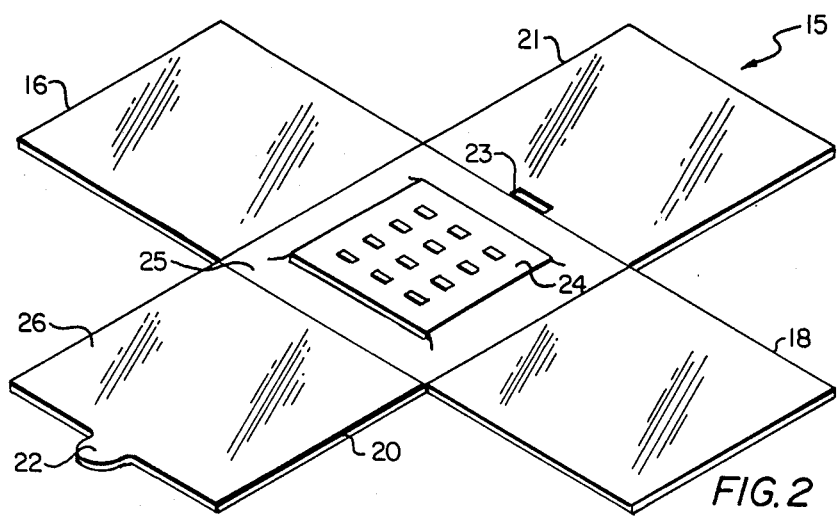
FIG. 2 is a perspective view of a sheet of packaging material according to the present invention which has a shape suitable for forming an anti-static package.

One type of anti-static package which may be formed from a sheet of material having the structure illustrated in FIG. 1 and explained hereinabove can be understood with reference to FIGS. 2 and 3. FIG. 2 illustrates a sheet of anti-static material 15 which is fabricated according to the above-described procedure and which has the shape of a cross. The cross includes a pair of opposing arms 16 and 18 and another pair of opposing arms 20 and 21. The arm 20 has a tab 22 along one edge and the arm 21 has a slot 23 which extends through the arm 21. A printed circuit card 24 is placed on the area 25 which is formed by the intersection of the arms of the cross. The surface 26 of the sheet 15 upon which the circuit card 24 rests has been coated with a static-resistive layer according to the procedure disclosed above.

Figure 3:
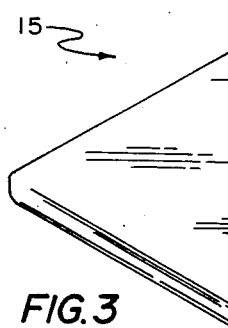
FIG. 3 is a perspective view of an anti-static package constructed from a sheet of packaging material according to the invention which has the form illustrated in FIG. 1.

The sheet 15 having the shape illustrated in FIG. 2 can be closed to hold the printed circuit board 24 in a six-sided container illustrated in FIG. 3. The coating of the surface 26 with the anti-static layer prevents the buildup of a static charges which may accumulate while the sheet 15 and the circuit board 24 are being handled during the packaging procedure.

As illustrated in FIG. 3, the sheet 15 can be formed into a six-sided container by folding the opposing arms 16 and 18 over the circuit board 24 and then folding first the arm 21 and then the arm 22 over the circuit board and the arms 16 and 18. To keep the package closed, the tab 22 is inserted through the slot 23.

Figure 4:
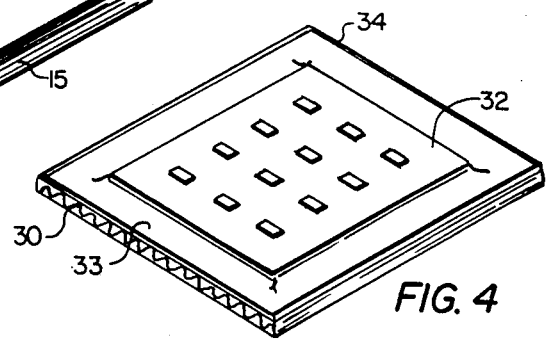
FIG. 4 is a perspective view of an anti-static package which is constructed from a support base of material according to the present invention and an anti-static skin-packaging material which encloses it.

FIG. 4 illustrates the use of material fabricated according to the method of the invention in a skin-packaging procedure. In the procedure, a sheet of material 30 which is fabricated according to the above-disclosed method supports a printed circuit board 32 on a layer 33 of anti-static material. Preferably, the sheet 30 is cut so that a continuous border of the layer 33 surrounds the circuit board 32. The sheet 30 with the circuit board 32 resting thereon is then sealed by any typical skin-packaging technique with a film of flexible plastic packaging material 34. During the packaging operation, the material 34 will bond to itself and to the layer 33 of anti-static material. This will enhance the quality of the completed package by increasing the total area of the completed bond. An apparatus which can form the skin-packaged container illustrated in FIG. 4 is available from Ampack Corporation under the Model Name "Poly-Tite, Port-A-Vac 300 Series".

During packaging operations, the package illustrated in FIG. 4 prevents the buildup of static charges between the material sheet 30 and the circuit card 32 by the provision of the anti-static layer 33. It should be evident that use of an anti-static material for the flexible plastic sheet 34 will enhance the static prevention qualities of the FIG. 4 package. Moreover, it should be evident that the circuit card 32 can be packaged between two sheets of material fabricated according to the above-disclosed method with the coated surface of each sheet contacting the surface board.

Obviously, many modifications and variations of the present invention are possible in light of the above teachings, and it is therefore to be understood that the invention may be practiced otherwise than as specifically described.

What is claimed is:

1. An electrostatic-free package, comprising:
   a planar, semi-rigid deformable substrate having a surface with a surface portion for supporting an item to be packaged;
   a single layer of resistively anti-static, heat-sealable material including a homogeneous mixture of polyethylene and an organic, anti-static compound, said layer extending over and bonded to said surface.

2. The package of claim 1 wherein said substrate has the form of a cross with a center including said surface portion, opposing first and second arms, each of said first and second arms foldable over said center or over the other arm of said first and second arms when said other arm is folded over said center, a third arm with a slotted opening, said third arm foldable over said center and said first and second arms when said first and second arms are folded, a fourth arm opposing said third arm and foldable over said third arm when said third arm is folded over said center and said first and second arms, and a tab on said fourth arm for being received into said slotted opening to releasably close said package when said fourth arm is folded over said third arm.

3. The package of claim 1 wherein said surface includes a continuous border portion surrounding said surface portion and, when a static-sensitive item is placed on said surface portion to be packaged, said package further includes a sheet of flexible, heat-sealable, resistively anti-static film covering said surface portion and bonded to the portion of said anti-static layer extending over said border portion to form a vacuum-tight enclosure over said surface portion.

4. A package for vacuum-packaging a static sensitive item, comprising:
   a planar, semi-rigid substrate having a surface with a central supporting portion and a border portion surrounding said central supporting portion;
   a layer of heat-sealable, resistivity anti-static material including a homogeneous mixture of polyethylene and an organic, anti-static compound, said layer extending over and bonded to substantially all of said surface; and
   a sheet of flexible, heat-sealable, resistively anti-static film covering said surface and bonded to said border portion to form a vacuum-sealed enclosure over said central supporting portion.

5. A six-sided, electrostatic-free package, comprising:
   a semi-rigid deformable cardboard substrate having a supporting surface;
   a layer of heat-sealable, resistively anti-static polyethylene extending over and bonded to substantially all of said surface;
   wherein said substrate is in the shape of a cross having a center portion, a first arm foldable over said center portion to place a portion of said surface on said first arm in facing opposition with another portion of said surface on said center portion, a second arm opposing said first arm and foldable over said center portion and said first arm when said first arm is folded over said center portion, a third arm with a slot, said third arm foldable over said portion and said first and second arms are folded over said center portion, and a fourth arm foldable over said center portion when said first, second, and third arms are folded over said center portion; and
   a tab formed on said fourth arm for being received into said third arm slot to releasably close said package when said fourth arm is folded over said third arm.

* * * * *